United States Patent
Mondal et al.

(10) Patent No.: US 12,466,940 B2
(45) Date of Patent: *Nov. 11, 2025

(54) RUBBER COMPOSITION FOR TYRES WITH LOW ROLLING RESISTANCE AND GOOD WINTER PROPERTIES

(71) Applicant: Apollo Tyres Global R&D B.V., Enschede (NL)

(72) Inventors: Anup Mondal, Enschede (NL); Tharik Mohamed, Enschede (NL); Louis Reuvekamp, Enschede (NL)

(73) Assignee: Apollo Tyres Global R&D B.V., Enschede (NL)

( * ) Notice: Subject to any disclaimer, the term of this patent is extended or adjusted under 35 U.S.C. 154(b) by 654 days.

This patent is subject to a terminal disclaimer.

(21) Appl. No.: 17/767,217

(22) PCT Filed: Oct. 7, 2020

(86) PCT No.: PCT/EP2020/078155
§ 371 (c)(1),
(2) Date: Apr. 7, 2022

(87) PCT Pub. No.: WO2021/069514
PCT Pub. Date: Apr. 15, 2021

(65) Prior Publication Data
US 2022/0372254 A1    Nov. 24, 2022

(30) Foreign Application Priority Data
Oct. 8, 2019   (LU) .................................. LU101429

(51) Int. Cl.
  *C08L 9/06*   (2006.01)
  *B60C 1/00*   (2006.01)
  *C08L 9/00*   (2006.01)

(52) U.S. Cl.
  CPC .............. *C08L 9/06* (2013.01); *B60C 1/0016* (2013.01); *C08L 9/00* (2013.01); *C08L 2205/025* (2013.01); *C08L 2205/035* (2013.01); *C08L 2312/08* (2013.01)

(58) Field of Classification Search
  CPC ........ C08L 9/06; C08L 9/00; C08L 2205/035; C08L 2312/08; B60C 1/0016; C08K 3/36; C08K 5/548
  See application file for complete search history.

(56) References Cited

U.S. PATENT DOCUMENTS

| | | | |
|---|---|---|---|
| 7,342,070 B2 | 3/2008 | Tsukimawashi et al. | |
| 9,145,485 B2 * | 9/2015 | Okada | B60C 1/0016 |
| 10,214,636 B2 * | 2/2019 | Maeng | B60C 1/0016 |
| 11,104,782 B2 * | 8/2021 | Maejima | C08L 7/00 |
| 2015/0148448 A1 * | 5/2015 | Jung | C08K 5/548 523/156 |
| 2018/0072110 A1 * | 3/2018 | Kagimoto | B60C 9/18 |
| 2019/0218377 A1 * | 7/2019 | Ganesan | B60C 1/0016 |
| 2020/0183008 A1 * | 6/2020 | Chen | G01S 17/88 |
| 2023/0331042 A1 * | 10/2023 | Hishikawa | B60C 1/0016 |
| 2024/0327627 A1 * | 10/2024 | Singh | C08L 9/06 |

FOREIGN PATENT DOCUMENTS

| | | | |
|---|---|---|---|
| DE | 102015210422 A1 | 12/2016 | |
| EP | 0764688 A1 | 3/1997 | |
| EP | 2213477 A1 | 8/2010 | |
| EP | 2412731 A1 | 2/2012 | |
| EP | 2460848 A1 * | 6/2012 | ............... B60C 1/00 |
| EP | 2716700 A1 | 4/2014 | |
| EP | 2733171 A1 | 5/2014 | |
| EP | 3450203 A1 | 3/2019 | |
| EP | 3450204 A1 | 3/2019 | |
| WO | WO-2018158418 A1 * | 9/2018 | ........... B60C 1/0016 |
| WO | 2019141667 A1 | 7/2019 | |
| WO | WO-2019154866 A1 * | 8/2019 | ............... C08L 9/00 |
| WO | WO-2020183008 A1 * | 9/2020 | ........... B60C 1/0016 |
| WO | WO-2023144209 A1 * | 8/2023 | |

OTHER PUBLICATIONS

International Search Report and Written Opinion corresponding to Application No. PCT/EP2020/078155 mailed Oct. 28, 2020.
International Preliminary Report on Patentability for corresponding Application No. PCT/EP2020/078155 issued on Apr. 12, 2022.

* cited by examiner

*Primary Examiner* — Katarzyna I Kolb
(74) *Attorney, Agent, or Firm* — Renner, Otto, Boisselle & Sklar, LLP

(57) ABSTRACT

The present invention relates to a cross-linkable rubber composition, a cross-linked rubber composition obtained by cross-linking such a rubber composition, a method of preparing a tyre and a tyre. In a cross-linkable rubber composition the cross-linkable rubber composition comprises, per hundred parts by weight of rubber (phr): ≤50 phr of a first rubber, the first rubber being a solution polymerized styrene-butadiene rubber (SSBR) comprising an alkoxysilane group and a primary amino group; ≥20 phr of a second rubber; and a coupling agent, a filler, and a resin, wherein the rubber composition comprises ≥15 phr of a third rubber; and ≥10 phr of a fourth rubber; and wherein the composition comprises ≥1 phr to ≤20 phr of at least two coupling agents wherein one of the coupling agents is or comprises a mercapto based silane and wherein the ratio of the mercapto based silane to the second coupling agent is in a range of ≥2:1 to ≤10:1.

10 Claims, No Drawings

RUBBER COMPOSITION FOR TYRES WITH LOW ROLLING RESISTANCE AND GOOD WINTER PROPERTIES

This application is a national phase of International Application No. PCT/EP2020/078155 filed Oct. 7, 2020, which claims priority to Luxembourg Application No. LU101429 filed Oct. 8, 2019, the entire disclosures of which are hereby incorporated by reference.

The present invention relates to a cross-linkable rubber composition, a cross-linked rubber composition obtained by cross-linking such a rubber composition, a method of preparing a tyre and a tyre.

Tread rubber is one of the important portions of a pneumatic tyre which contributes enormously to the overall performance of a tyre. A tyre has to perform well in severe weather conditions and it has to exhibit a variety of performances such as wet grip and low rolling resistance, while particularly all-season tyres have to observe a balanced property of snow and wet grip.

A tread compound can be optimized to exhibit good winter performance by using low $T_g$ polymers but it normally results in poor wet grip properties. On the other hand, tuning the rubber compound by using high $T_g$ polymers or performance resins to improve wet grip properties possibly leads to impairment in winter performance and/or rolling resistance.

On the one hand, improving rolling resistance of silica-filled rubber compounds for tyre tread cap typically normally results in a compromise in the wet grip. On the other hand, maintaining wet grip and snow performance at the same level is challenging when improving the rolling resistance. For example, it is known that reducing the amount of silica in the rubber compound would typically improve the hysteresis property (rolling resistance) but compromise the wet grip. Good rolling resistance compounds for tyre tread cap are achieved using silica-based rubber compounds comprising coupling agents such as bifunctional silanes or mercaptosilanes. However, these compounds do not exhibit good wet grip performance.

EP 0 764 688 A1 discloses a high performance polybutadiene rubber blend for utilization in manufacturing tyre tread compounds comprising a first, a second polybutadiene rubber, and a third polybutadiene rubber. The polybutadiene rubber are selected from super-high, high, medium or low vinyl content and the blend contains at least 10 parts of each of the polybutadiene rubbers. The blend is employed to improve the wet skid resistance and traction characteristics of tyres without sacrificing tread wear or rolling resistance. The tyres however provide no snow performance.

WO 2019 141 667 A1 is directed to a cross-linkable rubber comprising at least 25 phr of a first rubber, the first rubber being a solution polymerized styrene-butadiene rubber (SSBR) comprising an alkoxysilane group and a primary amino group; a second rubber; and an aliphatic or aromatic resin. The composition may comprise 50 to 80 phr of the functionalised first SSBR rubber.

Optimizing the tread compound for rolling resistance normally results in trade-off in winter performance. The present invention has the object to at least partially overcome the drawbacks and in particular to provide a composition for a tyre tread which has improved rolling resistance, without compromising on snow performance.

This object is achieved by a cross-linkable rubber composition according to claim 1, a cross-linked rubber composition according to claim 10. Advantageous embodiments are the subject of dependent claims. They may be combined freely unless the context clearly indicates otherwise.

Hence, a cross-linkable rubber composition is provided, the cross-linkable rubber composition comprising, per hundred parts by weight of rubber (phr):
≤50 phr of a first rubber, the first rubber being a solution polymerized styrene-butadiene rubber (SSBR) comprising an alkoxysilane group and a primary amino group;
≥20 phr of a second rubber; and
a coupling agent, a filler, and a resin,
wherein the rubber composition comprises
≥15 phr of a third rubber; and
≥10 phr of a fourth rubber; and
wherein the composition comprises ≥1 phr to ≤20 phr of at least two coupling agents wherein one of the coupling agents is or comprises a mercapto based silane and wherein the ratio of the mercapto based silane to the second coupling agent is in a range of ≥2:1 to ≤10:1.

It has surprisingly been found that such a rubber composition provides for a balanced performance of hysteresis and snow performance. The composition can perform well for an all season tread with a balanced property of snow and wet grip.

It will be understood that in formulations discussed in connection with the present invention the phr amount of all rubber components adds up to 100. Furthermore, a mixture of rubbers which satisfies the definition of the first, second, third and fourth rubber according to the invention is also regarded as the first, second, third and fourth rubber, respectively. The cross-linkable rubber composition according to the invention comprises cross-linkable groups in the individual rubber components. They may be cross-linked (cured, vulcanised) by methods known to a skilled person in the rubber technology field.

The composition comprises a blend of four rubbers. The second, the third and the fourth rubber may be selected from the group of solution polymerized styrene-butadiene rubber (SSBR), polybutadiene rubber (BR), and natural rubber (NR). Without being bound to a specific theory, it is assumed that the polymer blend comprising at least four diene rubbers selected from NR, BR, and SSBR, wherein at least one SSBR comprises an alkoxysilane group and a primary amino group, contributes to the good hysteresis and snow performance of the cured composition.

The first rubber is a SSBR which comprises alkoxysilane groups such as —Si(OR)$_3$ with each R independently being an alkyl rest. Preferred are trimethoxysilane groups and triethoxysilane groups. Furthermore, this SSBR also comprises primary amino groups —NH$_2$. Such dual-functionalised SSBRs are commercially available and may be synthesised from unfunctionalised SSBRs by methods known in the art such as hydrosilylation with H—Si(OR)$_3$ compounds, thiol-ene-coupling using aminothiol compounds and hydrosilylation with H—Si(OR)$_2$-Linker-NH$_2$ compounds. For example, and as taught in U.S. Pat. No. 7,342,070, the first rubber may be of the formula (I) or (II):

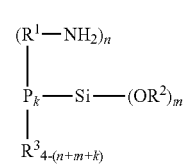

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

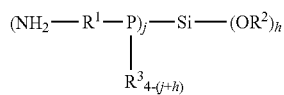

$$(NH_2\!-\!\!-\!R^1\!-\!\!-\!P)_j\!-\!\!-\!Si\!-\!\!-\!(OR^2)_h \qquad \text{II}$$
$$R^3{}_{4-(j+h)}$$

wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4. The first rubber may comprise ≥25% to ≤35%, preferably ≥27 to ≤29%, as determined by nuclear magnetic resonance (NMR) spectroscopy, of styrenic groups. In the first rubber ≥75 mol-%, preferably ≥90 mol-% to ≤100 mol-%, as determined by nuclear magnetic resonance (NMR) spectroscopy, of the alkoxysilane groups and the primary amino groups are located at the chain ends of the rubber polymer chains.

The first rubber may have a glass transition temperature $T_g$ of ≥−30° C. to ≤0° C. The glass transition temperatures $T_g$ as referred herein are measured by differential scanning calorimetry (DSC) according to ISO 22768. This norm specifies a heating rate of 20° C./min. Preferably the first rubber has a glass transition temperature $T_g$ of ≥−28° C. to ≤−20° C. The first rubber thus is a rubber with comparatively high $T_g$.

The first rubber preferably is combined with low $T_g$ rubbers. In embodiments, the second, the third and the fourth rubber are selected from the group of solution polymerized styrene-butadiene rubber (SSBR), polybutadiene rubber (BR), and natural rubber (NR), and the second, the third and/or the fourth rubber have a glass transition temperature $T_g$ of ≥−120° C. to ≤−40° C., the glass transition temperatures $T_g$ being measured by differential scanning calorimetry (DSC) according to ISO 22768. Preferably, the second, the third and the fourth rubber have a glass transition temperature $T_g$ of ≥−120° C. to ≤−40° C. Using low $T_g$ rubbers in combination with a first high $T_g$ rubber can improve snow and rolling resistance performance in balance with wet grip.

In embodiments, the second rubber is a butadiene rubber (BR) with a cis group content, as determined by infrared spectroscopy (IR), of ≥90%, which is preferably obtained under neodymium catalysis (Nd BR). Preferably the cis group content is ≥93%. The cis content of the polybutadiene rubber is usually provided by the supplier and may be determined with FTIR. Butadiene rubber obtained under neodymium catalysis usually is a lower branched BR compared to nickel catalysis. The second rubber may have a polydispersity index Mw/Mn of ≥2 to ≤3 and a branching index G of ≥1.5 to ≤3.

In embodiments, the third rubber is a solution polymerized styrene-butadiene rubber (SSBR) having a glass transition temperature $T_g$ of ≥−120° C. to ≤−40° C., the glass transition temperature $T_g$ being measured by differential scanning calorimetry (DSC) according to ISO 22768. Preferably the first styrene-butadiene rubber is a functionalized styrene-butadiene rubber and the further styrene-butadiene rubber is an unfunctionalised styrene-butadiene rubber. A blend of the first SSBR comprising an alkoxysilane group and a primary amino group and a further SSBR having a low $T_g$ is considered to contribute to a further improvement in rolling resistance and snow performance.

In embodiments, the fourth rubber is a natural rubber. The natural rubber may be a sheet processed natural rubber such as a Ribbed Smoked Sheets (RSS) rubber or may be a Technically Specified Rubber (TSR). TSR grades such as TSR10, TSR20 are preferred as tyre tread compound.

In embodiments, the composition comprises:
- ≥10 phr to ≤40 phr, preferably ≥20 phr to ≤30 phr, of the first rubber;
- ≥20 phr to ≤40 phr, preferably ≥30 phr to ≤35 phr, of the third rubber, preferably of a Nd BR with a $T_g$ of ≥−120° C. to ≤−40° C.;
- ≥10 phr to ≤30 phr, preferably ≥15 phr to ≤25 phr, of the third rubber, preferably of a non-functionalised SSBR having a $T_g$ of ≥−120° C. to ≤−40° C.; and
- ≥10 phr to ≤20 phr, preferably ≥15 phr to ≤20 phr, of the fourth rubber, preferably of a natural rubber with a $T_g$ of ≥−120° C. to ≤−40° C.

It is understood that the phr amount of all rubber components in the composition adds up to 100.

The cross-linkable rubber composition comprises two coupling agents. The use of two coupling agents wherein one of the coupling agents is or comprises a mercapto based silane was found to improve the hysteresis of the composition comprising a rubber blend. The ratio of the mercapto based silane to the second coupling agent may be in a range of ≥2:1 to ≤10:1, preferably in a range of ≥2:1 to ≤4:1. In the context of this invention a "mercapto based silane" denotes a silane coupling agent containing one or more mercapto group. Examples for mercapto based silanes are 3-mercaptopropylmethyldimethoxysilane, 3-mercaptopropyltrimethoxysilane, and 3-isocyanatopropyltriethoxysilane. A specific example for mercapto based silanes is Silaan VP Si 363 Degussa available by Evonik Industries. In an embodiment, the second coupling agent is selected from disulfide silanes, tetrasulfide silanes or a combination thereof. A specific example for a disulphide silane is TESPD available by Evonik Industries. A specific example for a tetrasulphide silane is TESPT available by Evonik Industries. The cross-linkable rubber composition may comprise ≥1 phr to ≤15 phr of the at least two coupling agents.

In preferred embodiments, the composition comprises ≥1 phr of a resin. The cross-linkable rubber composition may comprise ≥1 phr ≤35 phr, preferably ≥12 phr to ≤25 phr, of a resin. The resin may have a glass transition temperature $T_g$ of ≥30° C., preferably of ≥60° C. to ≤130° C. The resin may be a an aromatic resin, aliphatic resin, terpene resin, polyterpene resin, terpene phenolic resin, alpha methyl styrene (AMS) resins, a C5 resin, C9 resin, dicyclopentadiene (DCPD) resin or a combination thereof.

It is also preferred that the rubber composition comprises a filler component. The filler can be carbon black, silica or a combination of both. In embodiments, the composition comprises ≥60 phr ≤130 phr of silica. Silica filler may increase the wet grip and wear resistance. Silica filler in combination with the silane compounds further may improve a balanced rolling resistance and snow performance.

The cross-linkable rubber compositions may be sulfur-vulcanizable and/or peroxide-vulcanizable. If desired, additives can be added. Examples of usual additives are stabilizers, antioxidants, lubricants, fillers, dyes, pigments, flame retardants, conductive fibres and reinforcing fibres.

Another aspect of the present invention is a cross-linked rubber composition that is obtained by cross-linking a rubber composition according to the invention.

In an embodiment, the cross-linked rubber composition has a tan delta at 0° C. of ≥0.2 to ≤0.5 (determined from dynamic mechanical analysis (DMA) measurements according to ISO 4664-1, frequency 10 Hz, 0.1% dynamic strain) or a tan delta at 70° C. of ≥0.05 to ≤0.15 (determined from DMA measurements according to ISO 4664-1, frequency 10 Hz, 6% dynamic strain). Preferably the tan delta at 0° C. is ≥0.28 to ≤0.34 or the tan delta at 70° C. is ≥0.08 to ≤0.14. In an embodiment, the cross-linked rubber composition has a tan delta at 0° C. of ≥0.2 to ≤0.5 (determined from dynamic mechanical analysis (DMA) measurements according to ISO 4664-1, frequency 10 Hz, 0.1% dynamic strain) and a tan delta at 70° C. of ≥0.05 to ≤0.15 (determined from DMA measurements according to ISO 4664-1, frequency 10 Hz, 6% dynamic strain). Preferably the tan delta at 0° C. is ≥0.28 to ≤0.34 and the tan delta at 70° C. is ≥0.08 to ≤0.14.

In another embodiment of the cross-linked rubber composition, the G' (storage modulus) at −20° C. (determined from DMA measurements according to ISO 4664-1) ranges from 15 to 30 MPa. Preferably, the G' (storage modulus) is in a range from ≥15 MPa to ≤20 MPa.

In another embodiment the cross-linked rubber composition has a rebound at 70° C., determined according to ISO 4662, of ≥50% to ≤75%. Preferably the rebound at 70° C. is in a range from ≥54% to ≤70%.

The present invention also relates to a method of preparing a tyre, comprising the steps of:
providing a tyre assembly comprising a rubber composition according to the invention;
cross-linking at least the rubber composition according to the invention in the tyre assembly.

The present invention also encompasses a tyre comprising a tyre tread, characterised in that the tyre tread comprises a cross-linked rubber composition according to the invention.

The present invention will be further described with reference to the following examples without wishing to be limited by them.

Methods

Tensile strength: Tensile strength analysis was performed for cured samples on a Zwick Z005 apparatus with a speed of 500 mm/min speed. Samples were cured at 160° C. for 20 minutes and standard tensile specimens were cut from rubber sheet according to ISO 37 standard. Measuring tensile strength and force elongation properties via tensile method also determines modulus at various elongations i.e. 25%, 100%, 200% & 300% which indicates static stiffness.

Hardness Test: A hardness test was performed on a Zwick 3150 Shore A Hardness Tester according to DIN-53505 at 23° C. The hardness (in Shore A) for a test specimen was measured by making 5 determinations at different positions using a Durometer type A as described in the Hardness Shore A manual from Zwick. The determinations were at least 6.0 mm apart and at least 12 mm from any edge.

Temperature sweep by DMA: Dynamic mechanical analysis (DMA) analysis was performed for cured samples by Metravib DMA+450 in double shear mode. DMA was performed by temperature sweep at constant frequency 10 Hz with 6% strain in a temperature range of 25° C. to 80° C. DMA was also performed by temperature sweep at constant frequency 10 Hz with 1% strain in a temperature range of −80° C. to 25° C.

Strain sweep by DMA: Dynamic mechanical analysis (DMA) analysis was performed for cured samples by Metravib DMA+450 in double shear mode. DMA was performed by strain sweep at constant frequency 10 Hz with 65% strain in double shear mode at 40° C.

Rebound: Rebound measurements were performed for cured samples on a Zwick/Roell 5109 Rebound Resilience Tester according to the standardised ISO4662 method at 23° C. and 70° C.

RPA Payne effect: The storage shear moduli (G') of rubber compounds was evaluated by using Alpha Rubber Process Analyzer (RPA 2000) (Alpha Technologies, Akron, USA) under the temperature of 100° C., frequency of 0.5 Hz and varying strains in the range of 0.28-100%. The Payne effect was calculated from different storage shear moduli at low strain (0.56%) and high strain (100%).

Rolling resistance ECE R117: the Rolling resistance (kg/Ton) was determined using an indoor drum test according to ISO28580.

Snow Handling, snow acceleration and snow deceleration of tyres were determined using outdoor car tests.

EXAMPLE 1

In accordance with the preceding, cross-linkable rubber compositions were prepared according to the following table 1. In a first step, the rubber components were added and mixed, followed by a second step wherein the additives were added and mixed and a last step wherein the curing package was added. Composition Ref1 is a comparative example and compositions E1 and E2 are the compositions according to the invention. Amounts for the components are given in PHR. Unless stated otherwise, glass temperatures given were determined by DSC according to ISO 22768.

TABLE 1

Composition of Examples:

| Component | Ref1 (phr) | E1 (phr) | E2 (phr) |
|---|---|---|---|
| NR | 10 | 15 | 10 |
| BR | 55 | 35 | 30 |
| SSBR I | — | 35 | 35 |
| SSBR II | 40 | 15 | 25 |
| SSBR III | 10 | — | — |
| Fillers | 130 | 120 | 120 |
| Coupling agent 1 | — | 9 | 9 |
| Coupling agent 2 | 10 | 1 | 2 |
| Resin | 30 | 25 | 25 |
| Processing aids | 34 | 33 | 33 |
| Anti-degradation agents | 6 | 5 | 5 |
| Curing agents | 11 | 9.5 | 9.5 |

The reference composition used a standard recipe without resin for a reference tread compound based on NR, NiBR, SSBR polymer, Ni-catalysed BR and reinforcing or inert filler content between 60-130 phr. The experimental tread compounds E1 and E2 comprised a resin and substituted the Ni-catalysed BR completely by Nd-catalysed BR. Further a functionalized non oil extended SSBR was substituted by a blend of a fourth generation SSBR and a low Tg SSBR.

NR rubber was TSR 20, with a Mooney Viscosity 80 and a Tg of −70° C.

BR rubber used for E1 and E2 was Nd catalyzed butadiene rubber with a cis content of 95% and a $T_g$ of −102° C.

SSBR I was HPR850 manufactured by JSR Corporation, a solution polymerized styrene-butadiene rubber (SSBR) comprising an alkoxysilane group and a primary amino group with a styrene content of 27 wt. % and vinyl content of 58.8% and a $T_g$ of −25° C., non-oil extended product was used.

SSBR II was a functionalised SSBR and had a styrene content of 15%, a vinyl content of 30% and a $T_g$ of −65° C.

SSBR III was a non oil extended SSBR with a styrene content of 21%, a vinyl content of 63% and a $T_g$ of −24° C.

Fillers used in the above examples were Carbon black N339 and High Dispersion Micro-Pearl Silica (HDS, MP) supplied by PPG Industries Coupling agent 1 was Silaan VP Si 363 Degussa supplied by Evonik Industries.

Coupling agent 2 was TESPD (disulphide silane) supplied by Evonik Industries. The reference example "Ref1" had TESPD and thiocarboxylate (NXT) as the silane component.

The Resin used was Sylvatraxx 4202 with a molecular weight of 565 g/mol supplied by Kraton Corporation.

Rebound at 70° C. and Tan delta (70° C.) were measured to check (relate) for rolling resistance (RR) of the compounds. Rebound at 23° C. and Tan delta (0° C.) were measured to check wet grip. Further, a DMA shear strain sweep (<65%) was performed at 40° C. to evaluate rolling resistance (RR). Payne effect was measured using a rubber process analyzer. The following table 2 shows the results obtained from the cured compositions.

TABLE 2

| Test results: | | | |
|---|---|---|---|
| Component | Ref1 | E1 | E2 |
| Rebound 23° C. [%] | 25.20 | 21.90 | 25.00 |
| Rebound (70° C.) [%] | 48.30 | 54.00 | 58.30 |
| Tan δ 70° C. (RR indicator) | 0.18 | 0.13 | 0.11 |
| Tan δ 0° C. (Wet grip indicator) | 0.219 | 0.283 | 0.316 |

The results show for the compositions E1 and E2 an increase of rebound at 70° C. from 48.30 to 54.00 and 58.30 respectively and a decrease in Tan delta at 70° C. from 0.18 to 0.13 and 0.11 respectively. Rebound testing at 70° C. (ISO 4662) is believed to be an indicator for rolling resistance (RR). A higher rebound value at 70° C. relates to a lower rolling resistance for a tyre whose tread comprises such a cured rubber. In a similar fashion, a lower tan δ at 70° C. is an indicator for improved rolling resistance.

Tan delta at 0° C. increased from 0.219 to 0.283 and 0.316 respectively. The reduction in rebound (ISO 4662) is a well-known indicator of an increase in the wet grip in the tyre industry. Lower rebound value at −23° C. relates to an improvement in wet grip. In a similar fashion, a higher tan δ at 0° C. is related to better wet grip.

Further, strain sweep measurements showed an almost independent Tan delta behavior under strain.

In summary, this shows a surprising improvement of the rolling resistance indicators and the wet grip indicators. Without being bound to a specific theory, it is believed that the coupling agents lower hysteresis.

EXAMPLE 2

In accordance with the preceding, cross-linkable rubber compositions were prepared according to the following table 1. In a first step, the rubber components were added and mixed, followed by a second step wherein the additives were added and mixed and a last step wherein the curing package was added. Composition Ref2 is a comparative example and composition E3 is the composition according to the invention. Amounts for the components are given in PHR. Unless stated otherwise, glass temperatures given were determined by DSC according to ISO 22768.

TABLE 3

| Composition of Examples: | | |
|---|---|---|
| Component | Ref2 (phr) | E3 (phr) |
| NR | 20 | 15 |
| BR | 30 | 35 |
| SSBR I | — | 30 |
| SSBR II | — | 20 |
| SSBR III | 50 | — |
| Fillers | 87 | 77 |
| Coupling agent 1 | — | 7 |
| Coupling agent 2 | 6.65 | 2 |
| Resin | — | 17 |
| Processing aids | 30 | 10.5 |
| Anti-degradation agents | 6 | 5 |
| Curing agents | 9 | 9 |

The reference composition used a standard recipe without resin for a reference tread compound based on NR, NiBR, SSBR polymer, Ni-catalysed BR and reinforcing or inert filler content between 60-100 phr. The experimental tread compound E3 comprised a resin and substituted the Ni-catalysed BR completely by Nd-catalysed BR. Further a functionalized non oil extended SSBR was substituted by a blend of a fourth generation SSBR and a low Tg SSBR.

NR rubber was TSR 20, with a Mooney Viscosity 80 and a Tg of −70° C.

BR rubber used for E3 was Nd catalyzed butadiene rubber with a cis content of 95% and a $T_g$ of −102° C.

SSBR I was HPR850 manufactured by JSR Corporation, a solution polymerized styrene-butadiene rubber (SSBR) comprising an alkoxysilane group and a primary amino group and with a styrene content of 27 wt. % and vinyl content of 58.8% and a $T_g$ of −25° C., non-oil extended product was used.

SSBR II was a functionalised SSBR and had a styrene content of 15%, a vinyl content of 30% and a $T_g$ of −65° C.

SSBR III was a functionalised non oil extended SSBR with a styrene content of 21%, a vinyl content of 63% and a $T_g$ of −24° C.

Fillers used in the above examples were Carbon black N339 and High Dispersion Micro-Pearl Silica (HDS, MP) supplied by PPG Industries Coupling agent 1 was Silaan VP Si 363 Degussa supplied by Evonik Industries.

Coupling agent 2 was TESPD (disulphide silane) supplied by Evonik Industries. The reference example "Ref2" had TESPD as the only silane component.

The Resin used was Sylvatraxx 4202 with a molecular weight of 565 g/mol supplied by Kraton Corporation.

Rebound at 70° C. and Tan delta (70° C.) were measured to check (relate) for rolling resistance (RR) of the compounds. G' (storage modulus) at −20° C. was measured for indication of snow performance and Tan delta (0° C.) was measured to indicate wet grip. Further, a DMA shear strain sweep (<65%) was performed at 40° C. to evaluate rolling resistance (RR). Payne effect was measured using a rubber process analyzer. The following table 4 shows the results obtained from the cured compositions.

TABLE 4

Test results:

| Component | Ref2 | E3 |
|---|---|---|
| Rebound 23° C. [%] | 36.20 | 40.40 |
| Rebound (70° C.) [%] | 58.3 | 67.6 |
| Tan δ 70° C. (RR indicator) | 0.16 | 0.09 |
| G' (−20° C.) [MPa] | 29.18 | 18.41 |
| Tan δ 0° C. (Wet grip indicator) | 0.1832 | 0.312 |

The results show for the composition E3 an increase of rebound at 70° C. from 58.30 to 67.60 and a decrease in Tan delta at 70° C. from 0.16 to 0.09. Rebound testing at 70° C. (ISO 4662) is believed to be an indicator for rolling resistance (RR). A higher rebound value at 70° C. relates to a lower rolling resistance for a tyre whose tread comprises such a cured rubber. In a similar fashion, a lower tan δ at 70° C. is an indicator for improved rolling resistance.

G' at −20° C. decreased from 29.18 to 18.41 which is an indicator of better snow grip.

Tan delta at 0° C. increased from 0.1832 to 0.312. The reduction in rebound (ISO 4662) is a well-known indicator of an increase in the wet grip in the tyre industry. Lower rebound value at −23° C. relates to an improvement in wet grip. In a similar fashion, a higher tan δ at 0° C. is related to better wet grip.

Further, strain sweep measurements showed an almost independent Tan delta behavior under strain.

In summary, this shows a surprising improvement of the rolling resistance indicators and the wet grip indicators. Without being bound to a specific theory, it is believed that this was achieved by substituting the functionalized non-oil extended SSBR by a blend of a SSBR comprising alkoxysilane primary amino groups and a low Tg SSBR, while the coupling agents are believed to lower hysteresis.

EXAMPLE 3

Two sets of two 205/55R16 All Season tyres were fabricated using the rubber compositions of the reference composition Ref2 and the composition according to the invention E3 and were tested for rolling resistance on a drum following procedure ECE R117. The following table 5 shows the results obtained from the tyre testing.

TABLE 5

Test results of tyres:

| | Ref2 | E3 |
|---|---|---|
| Rolling resistance ECE R117 [%] | 100 | 112 |

The results of the reference tyres were normalized to 100% and the rolling resistance as measured in KG/Ton is shown as a percentage change in the table 5. The results show that the rolling resistance was improved for the for the tyres fabricated from composition E3 from a baseline of 100% to 112%. This result illustrates a significant reduction in the rolling resistance of a tyre due to the rubber composition of the invention.

EXAMPLE 4

Two sets of four 205/55R16 All Season tyres were fabricated using the reference composition Ref and the composition according to the invention E3 and were tested for snow breaking and snow handling on a car in a snow testing ground. The following table 6 summarizes the results obtained from the snow testing of tyres.

TABLE 6 snow testing results of tyres:

| | Ref2 | E3 |
|---|---|---|
| Deceleration snow ABS [%] | 100 | 102.6 |
| Acceleration snow [%] | 100 | 101.8 |
| Handling Snow [%] | 100 | 104.6 |

The results of the reference tyres were normalized to 100% and acceleration and deceleration on snow is shown as a percentage from a baseline for the reference of 100% in the table 6. The results show that acceleration, deceleration and snow handling was improved for the tyres fabricated from composition E3.

These results illustrate an improvement in the snow performance of the tyres due to the rubber composition of the invention.

The invention claimed is:

1. A cross-linkable rubber composition, the cross-linkable rubber composition comprising, per hundred parts by weight of rubber (phr):
    ≥10 phr to ≤40 phr of a first rubber, the first rubber being a solution polymerized styrene-butadiene rubber (SSBR) comprising an alkoxysilane group and a primary amino group;
    ≥20 phr to ≤40 phr of a second rubber, the second rubber being a butadiene rubber (BR) with a cis group content, as determined by infrared spectroscopy (IR), of ≥90%;
    ≥15 phr to ≤30 phr of a third rubber, the third rubber being a solution polymerized styrene-butadiene rubber (SSBR) having a glass transition temperature Tg of ≥−120° C. to ≤−40° C., the glass transition temperature Tg being measured by differential scanning calorimetry (DSC) according to ISO 22768; and
    ≥10 phr to ≤20 phr of a fourth rubber, the fourth rubber being a natural rubber; and a coupling agent, a filler, and a resin,
    wherein the composition comprises ≥1 phr to ≤20 phr of at least two coupling agents wherein one of the coupling agents is or comprises a mercapto based silane and wherein the ratio of the mercapto based silane to the second coupling agent is in a range of ≥2:1 to ≤10:1.

2. The rubber composition according to claim 1, wherein the second and the fourth rubber have a glass transition temperature Tg of ≥−120° C. to ≤−40° C., the glass transition temperature Tg being measured by differential scanning calorimetry (DSC) according to ISO 22768.

3. The rubber composition according to claim 1, wherein the second coupling agent is selected from disulfide silanes, tetrasulfide silanes or a combination thereof.

4. The rubber composition according to claim 1, wherein the composition comprises ≥1 phr of an aliphatic or aromatic resin.

5. The rubber composition according to claim 1, wherein the composition comprises ≥60 phr≤130 phr of silica.

6. A cross-linked rubber composition, characterised in that it is obtained by cross-linking a rubber composition according to claim 1.

7. The cross-linked rubber composition according to claim 6, with a tan delta at 0° C. of ≥0.2 to ≤0.5 (determined from dynamic mechanical analysis (DMA) measurements according to ISO 4664-1, frequency 10 Hz, 0.1% dynamic strain) and a tan delta at 70° C. of ≥0.05 to ≤0.15 (determined from DMA measurements according to ISO 4664-1, frequency 10 Hz, 6% dynamic strain).

8. The cross-linked rubber composition according to claim 6, having a rebound at 70° C., determined according to ISO 4662, of ≥60% to ≤75%.

9. A method of preparing a tyre, comprising the steps of:
providing a tyre assembly comprising a rubber composition according to claim 1;
cross-linking at least the rubber composition in the tyre assembly.

10. A tyre comprising a tyre tread, characterised in that the tyre tread comprises a cross-linked rubber composition according to claim 6.

* * * * *